(12) United States Patent
Sghiouer

(10) Patent No.: US 11,755,548 B2
(45) Date of Patent: Sep. 12, 2023

(54) AUTOMATIC DATASET PREPROCESSING

(71) Applicant: BULL SAS, Les Clayes-sous-Bois (FR)

(72) Inventor: Kaoutar Sghiouer, Compiegne (FR)

(73) Assignee: BULL SAS, Les Clayes-sous-Bois (FR)

( * ) Notice: Subject to any disclaimer, the term of this patent is extended or adjusted under 35 U.S.C. 154(b) by 278 days.

(21) Appl. No.: 17/136,525

(22) Filed: Dec. 29, 2020

(65) Prior Publication Data

US 2021/0200749 A1  Jul. 1, 2021

(30) Foreign Application Priority Data

Dec. 31, 2019 (FR) ...................................... 1915808

(51) Int. Cl.
*G06F 16/215* (2019.01)

(52) U.S. Cl.
CPC .................................. *G06F 16/215* (2019.01)

(58) Field of Classification Search
None
See application file for complete search history.

(56) References Cited

U.S. PATENT DOCUMENTS

| 9,665,628 B1 * | 5/2017 | Dubey .................... G06F 16/35 |
| 2004/0083199 A1 | 4/2004 | Govindugari et al. |
| 2020/0089650 A1 * | 3/2020 | Sharma ................. G06K 9/6256 |

OTHER PUBLICATIONS

Oracle, "Identity Resolution and Data Quality Algorithms for Person Indexing", White Paper published Oct. 2, 2018. (Year: 2018).*
Zheng, Alice & AManda Casari, "Feature Engineering for Machine Learning: Principles and Techniques for Data Scientists", O'Reilly Media, Inc., Apr. 2018. (Year: 2018).*
Preliminary Search Report issued in corresponding French application FR 1915808 dated Jul. 20, 2020, 2 pages.
Search Report issued in EP20218019.6 dated Mar. 2, 2021 (9 pages).
Abedjan, et al., "Profiling relational data: a survey", The VLDB Journal, Springer Verlag, Berlin, DE, vol. 24, No. 4, Jun. 2, 2015.
Rahm, et al.: "Data Cleaning: Problems and Current Approaches", Quarterly Bulletin of the Computer Society of the IEEE Technical Committee on Data Engineering, Dec. 1, 2000.
Press, Gil, "Cleaning Big Data: Most Time Consuming, Least Enjoyable Data Science Task, Survey Says", Forbes.com, published Mar. 23, 2016 (5 pages).
Kandel, et al., "Wrangler: Interactive Visual Specification of Data Transformation Scripts", CHI 2011 Session: Developers & End-User Programmers; May 2011 (10 pages).

(Continued)

*Primary Examiner* — Scott A. Waldron
(74) *Attorney, Agent, or Firm* — ARC IP LAW, PC; Joseph J. Mayo

(57) ABSTRACT

The invention relates to a data processing method for preparing a dataset that includes a processor that receives a first plurality of data input streams to prepare an output dataset. The plurality of data input streams and the output dataset are different. The method includes standardizing the plurality of data input streams, encoding the normalized data, preprocessing missing data, and transmitting a preprocessed dataset. The invention further relates to a data processing system, and a recording medium on which the data processing program is recorded.

10 Claims, 5 Drawing Sheets

(56) References Cited

OTHER PUBLICATIONS

Kandel, et al., "Research Directions in data Wrangling: Visualizations and transformations for usable and credible data" Information Visualization (Oct. 2011).

Verborgh, et al., "Using OpenRefine", Amazon.com books excerpt; retrieved Apr. 4, 2023; first published Sep. 2013.

McKinney, Wes, "pandas: a Foundational Python Library for Data Analysis and Statistics," Python for High Performance and Scientific Computing, 2011, p. 1-9.

Pedregosa, et al., "Scikit-learn: Machine Learning in Python," Journal of Machine Learning Research 12 (2011) vol. 12, No. Oct, p. 2825-2830.

* cited by examiner

AUTOMATIC DATASET PREPROCESSING

The invention relates to the field of data analysis, and more particularly to the processing of data for preparing a dataset, which can be used in particular subsequently for advanced data modeling or exploitation phases. The invention relates to a data processing method for preparing a dataset as well as to a data processing system for preparing a dataset. The invention also relates to a data processing unit for preparing a dataset.

PRIOR ART

With the expansion of activities related to Big Data, the Data Scientist business has grown significantly in recent years. This business, which aims at taking advantage of the large amounts of data available in companies and large organizations, is based on a variety of statistical techniques and computer tools, but remains largely "home-made" today. Each organization and each dataset pose specific problems to which Data Scientists try to respond with "tailor-made" solutions.

This is due in particular to the very great heterogeneity of the available data, their often incomplete nature and the errors and inconsistencies contained in almost all datasets of significant size. In order to take these aspects into account, Data Scientists, before entering into advanced data modeling and exploitation phases, must first go through a phase of preprocessing and preliminary analysis of the data (cleaning, exploratory analysis). However, these tasks are extremely cumbersome and time-consuming. Thus, as highlighted in the study conducted by Forbes in 2016 and relayed in the article by G. PRESS, the Data Scientist spends 80% of his/her time on this process of data preprocessing and analysis and only 20% in pure algorithmics.

The data preprocessing and preliminary analysis phase accounts for a considerable part of the work of Data Scientists, which today relies essentially on the non-automated and/or systematized implementation of different tools, and without a federating framework for an easy and relevant comparison of the results obtained on a dataset following the application of different analysis techniques.

In 2011, the work of S. KANDEL et al. led to the development of the Wrangler tool, and then to the creation of the Trifacta company, which is developing a high performance preprocessing tool [KANDEL, 2011]. Nevertheless, this tool only makes it possible to facilitate textual type processing (use of regular expressions for example); to exploit data from databases (breakdowns, column groupings, etc.); to analyze messages syntactically.

It is in fact compared and evaluated in terms of time to the same processing carried out by Excel. Thus, it is only a tool for preprocessing raw data, but it is not able to perform statistics on the processed data. Precisely for this reason, the authors conclude in their perspectives that it is worthwhile to include other analytical techniques, including statistical techniques.

The open source program OpenRefine, developed by Google, is described in particular by R. Verborgh and M. De Wilde [VERBORGH, 2013]. However, it is a tool for processing unstructured data, in order to clean it and convert it from one format to another. Again, the tool does not perform any statistical analysis of the injected data.

The R language allows to perform statistical calculations and also to develop Machine Learning applications. It integrates numerous modules that allow the Data Scientist to easily perform this type of processing as well as preprocessing of data. It thus allows: data manipulation, via numerous data manipulation libraries; data visualization, a technique implemented in the ggplot2 tool for example presented by W. HADLEY [HADLEY, 2016]. This allows to build a set of geometric objects ("geoms") from a restricted dataset. However, there is no easy-to-use interface, other than the programming language itself, which is fast and accessible, allowing any user whether or not they are computer-literate to implement Machine Learning applications.

Like the R language, the Python language is very widespread in the scientific world and has libraries dedicated to data analysis, notably: Pandas, which facilitates data manipulation, via adapted data structures and cleaning, formatting or other preprocessing operations [MCKINNEY, 2011]; Scikit-learn (sometimes abbreviated to sklearn), which provides different classification, regression and clustering algorithms for statistical analysis [PEDREGOSA, 2011].

Thus, there is a multitude of solutions for preprocessing the data involved in machine learning processes. However, depending on the values to be processed, the algorithms do not behave in the same way and this affects the result they output. Indeed, as the degree of complexity of the analysis increases, there is a risk that a same dataset may be interpreted differently by several techniques which then provide divergent results. This complexity of analysis may be due to: the volume of the dataset; samples from a same population that may be random or missing; contained errors or inconsistencies. It then becomes essential to be able to assess the relevance of the results provided by the analysis techniques following their application to the dataset. From this point of view, it would seem necessary to have methods or tools for comparing the relevance of the test results of each method.

In addition, a lack of tools capable of performing preprocessing tasks in an automated/systematic manner can be observed. In fact, the tools of the prior art are limited to very basic data preprocessing (formatting, adding columns, etc.), making them time-consuming to use. It is therefore necessary to develop methods and systems that are less time-consuming than existing ones, simpler to use and automated and/or systematized, and that can support a large amount of data as well as heterogeneous data from different sources, for example.

This can become critical when applying machine learning to industrial processes. Indeed, in industrial systems, the operation of processes and more broadly the security of information systems can be controlled via machine learning based on the monitoring of a plurality of data sources each requiring special processing. However, in this context, there is a significant risk of security and industrial reliability if the processing methods are not finely adapted to each of the datasets and possibly automatically modified over time to follow the evolution of these data.

Indeed, in the context of the industrial use of predictive models trained via learning techniques, the appearance of new variables or the modification of variables over time, not taken into account by the predictive model used, often makes the prediction model obsolete. Since the selected predictive model is based on probability laws that allow a dataset to be interpreted, the addition, deletion or change of variables, not taken into account by the prediction model, often requires a redesign of the prediction model, which is often time-consuming. A prediction model that is no longer suitable will therefore not be able to anticipate the appearance of anomalies in industrial processes, such as breakdowns or resource requirements in the context of predictive maintenance of HPC computing infrastructure, the consideration of data as outliers or as characteristic of an anomaly in a dataset in the context of a misinterpretation of a dataset in the context of cyber security or, more generally, monitoring for detecting attacks or fraud.

However, there is no existing solution for automatically processing the datasets, especially in the context of an application to industrial processes. It is therefore up to the user to analyze all the results provided by the different methods in order to draw conclusions and choose the processing that seems to correspond most closely to the dataset under study.

Finally, the solutions of the state of the art are not very accessible, following a "black box" logic. They are primarily intended for Data Science experts, either: for carrying out all the preprocessing steps, or for interpreting/understanding the results obtained following correlation tests. The tools therefore do not explain to the user why the correlation between an analytical method and a dataset has succeeded or failed. In addition, some tools require knowledge/mastery of programming and computer languages to be manipulated.

Technical Problem

The invention therefore aims at overcoming the disadvantages of the prior art. In particular, the invention aims at providing a data processing method for preparing a dataset, said method being fast and simple to implement, with a reduced number of steps, allowing the reliability and relevance of the processed dataset to be controlled while being simple to use. Moreover, such a method is automated and systematized allowing easy application to any industrial process. This method is also accessible to any user while being able to support a large amount of data, which may be heterogeneous. Moreover, it is particularly suitable for the monitoring of industrial processes and more particularly of information systems.

The invention further aims at providing a data processing system for preparing a dataset, said system being simple and fast to use. In addition, the system according to the invention is accessible and capable of processing a large volume of data. The system according to the invention also allows the reliability and relevance of the data to be controlled.

BRIEF DESCRIPTION OF THE INVENTION

To this end, the invention relates to a data processing method for preparing a dataset implemented by a computing device comprising a data processing unit, said data processing unit receiving a plurality of data input streams from different data providers, and comprising a group of interconnected processing modules through which the first plurality of data streams pass to prepare the output dataset, the plurality of data input streams and the output dataset being different, said method comprising:
- A step of standardizing the plurality of data input streams, by a data descriptive analysis module, from the plurality of data input streams, for normalizing the data at the input of the processing unit,
- A step of encoding the normalized data, by the data descriptive analysis module, for transforming the plurality of normalized data input streams into a plurality of normalized and encrypted data input streams,
- A step of preprocessing the dataset, by a data processing module, from the plurality of normalized and encrypted data input streams, said preprocessing step comprising:
  - A step of data augmentation for the completion of the missing data taking into account the consistency of the normalized and encrypted data with predefined correlation tables,
  - A step of removing outliers from the plurality of normalized and encrypted data input streams, by processing with predetermined functions said normalized and encrypted data,
  - A step of verifying the fit of the plurality of data input streams processed with the predetermined functions, said verification step comprising the data processing module providing feedback to take actions aiming at injecting the plurality of processed data input streams back into the data processing module when the fit of the plurality of data input streams processed with the predetermined functions is divergent,
- A step of transmitting a preprocessed dataset, said dataset including normalized and encrypted data as well as new data generated in the step of data augmentation and preferably new data replacing outliers.

In the context of the fourth industrial revolution, machine learning models are increasingly used to solve various technical problems encountered in the implementation of industrial processes. While the preparation of datasets has often been considered as a low-stake step, it now seems clear that the value of a prediction generated by a learning model will be directly correlated to the quality of the datasets used for training a model, on the one hand, and also in production for the generation of the prediction, on the other hand.

In addition, in order to reinforce the confidence one can have in the predictions generated by learning models, it seems essential to control the generation of training and test datasets. However, there is no existing solution for automatically processing the datasets, especially in the context of an application to industrial processes. It is therefore up to the user to process all the results provided by the different methods in order to draw conclusions and choose the processing that seems to correspond most closely to the dataset under study.

Thus, the inventors have developed an automated data processing method for automatically performing normalized data encoding steps for transforming the plurality of normalized data input streams into a plurality of normalized and encrypted data input streams. In addition, the method allows outliers to be detected by comparing with predetermined functions, the data to be augmented for the completion of the missing data taking into account the consistency of the data with predefined correlation tables, and finally the fit of the plurality of data input streams processed with predetermined functions to be verified. Thus, autonomously, based on predefined correlation tables and predetermined functions, the processing method of the invention allows, from very diverse data, a preprocessed dataset to be generated. Such an automatically preprocessed dataset can then be used when implementing a learning model dedicated to the monitoring of an industrial process.

According to other optional features of the method, the latter may optionally include one or more of the following features, alone or in combination:
- The step of processing outliers from the plurality of normalized and encrypted data input streams includes comparing predetermined functions based on predetermined minimum and maximum thresholds.
- The data augmentation step includes interpolation for the completion of the missing data taking into account the consistency of the data with predefined correlation tables.

The step of verifying the fit of the plurality of data input streams processed with predetermined functions comprising feedback to the data processing module to take actions aiming at injecting the plurality of processed data input streams back into the data processing module when the fit of the plurality of data input streams processed with the predetermined functions is divergent.

the data providers include industrial production sensors and the preprocessed dataset is used by a machine learning model trained for monitoring an industrial process.

the industrial production sensors include connected objects, machine sensors, environmental sensors and/or computing probes.

the industrial process is selected from: an agri-food production process, a manufacturing production process, a chemical synthesis process, a packaging process or a process for monitoring an IT infrastructure.

industrial process monitoring corresponds to industrial process security monitoring and includes in particular predictive maintenance, failure detection, fraud detection, and/or cyber-attack detection. Predictive maintenance allows users to react to weak signals before a plant failure occurs by means of an alert of the method. Failure detection can correspond to the detection of a process step with a deviation from normal behavior or a defect in a device. Fraud detection can correspond, for example, to the identification of abnormal consumption of a resource in a resource distribution system, while the detection of a cyber-attack allows an intrusion generally external to the system to be detected and prevented.

it includes a step of automatically modifying predetermined functions and/or predefined correlation tables, used for the steps of removing outliers and data augmentation, respectively.

the preprocessed dataset is used as input data to a learning model trained for monitoring an industrial process and the automatic modification step is initiated when a variance is identified in the plurality of data input streams. In particular, the variance corresponds to the addition of a new input stream or the modification of the data form of an input stream already taken into account.

it includes a step of determining the data quality of the dataset, comprising determining a reliability indicator and a validity indicator, by a systematic means of transformation. This also allows the relevance of the model's output to be determined. In case of bad data input, the reliability of the prediction will be low.

when the reliability indicator and the validity indicator are respectively lower than a predetermined value, the data of the dataset is injected back into the data processing unit, by a data injection module.

it comprises a prior step of acquiring each data input stream, by an input control module, from a data store, the format of which is immediately usable by the data processing unit.

it comprises a step of displaying, by a communication module, the steps of data processing, the data correlations, the selected predetermined functions, the consistency of the data with predefined correlation tables, the fit of the plurality of data input streams processed with predetermined functions.

it comprises a verification step, according to a set of determined rules, at the output of interconnected processing modules through which the plurality of data streams pass to prepare the dataset, comprising filters, each being provided at the output of interconnected processing modules.

it comprises a step of selecting a predetermined function for which the fit between said predetermined function and one of the plurality of data input streams has the smallest discrepancy, by the data preprocessing module.

it comprises a step of generating an evaluation of the data, by an evaluation module, said step including comparing correlation indices for each of the data subsets and identifying, for each of the data subsets, predetermined distribution functions allowing a correlation higher than a predetermined threshold.

the data encoding step comprises:
  identifying the data to be encoded,
  modifying the identified data into encoded data, and
  storing the encoded data.

The completion of the missing data further comprises a step of classifying the missing data, by the data processing module.

The invention further relates to a data processing system for preparing a dataset implemented by a computing device, receiving a plurality of data input streams from different data providers, the computing device comprising a data processing unit and comprising a group of interconnected processing modules through which the first plurality of data streams pass to prepare the output dataset, the plurality of data input streams and the output dataset being different, said data processing unit comprising:

A data descriptive analysis module, configured to
    from the plurality of data input streams, standardize the data at the input of the processing unit, and
    transform the plurality of normalized data input streams into a plurality of normalized and encrypted data input streams,
  A data processing module, configured to, from the plurality of normalized and encrypted data input streams:
    complete the missing data taking into account the consistency of the normalized and encrypted data with predefined correlation tables,
    remove outliers from the plurality of normalized and encrypted data input streams, by processing with predetermined functions said normalized and encrypted data,
    verify the fit of the plurality of data input streams processed with the predetermined functions, taking actions aiming at injecting the plurality of processed data input streams back into the data processing module when the fit of the plurality of data input streams processed with the predetermined functions is divergent,
  A data output means configured to transmit the preprocessed dataset, said dataset including normalized and encrypted data as well as new data generated and preferably new data replacing outliers from the plurality of data input streams processed by the data processing unit.

The invention further relates to a data processing unit for preparing a dataset implemented by a computing device, receiving a plurality of data input streams from different data providers, and comprising a group of interconnected processing modules through which the plurality of data input streams pass to prepare the output dataset, the plurality of data input streams and the output dataset being different, said processing unit comprising:

A data descriptive analysis module, configured to
from the plurality of data input streams, standardize the data at the input of the processing unit, and
transform the plurality of normalized data input streams into a plurality of normalized and encrypted data input streams,
a data processing module, configured to, from the plurality of normalized and encrypted data input streams:
complete the missing data taking into account the consistency of the normalized and encrypted data with predefined correlation tables,
remove outliers from the plurality of normalized and encrypted data input streams, by processing with predetermined functions said normalized and encrypted data,
verify the fit of the plurality of data input streams processed with the predetermined functions, taking actions aiming at injecting the plurality of processed data input streams back into the data processing module when the fit of the plurality of data input streams processed with the predetermined functions is divergent,
A data output means configured to transmit the preprocessed dataset, said dataset including normalized and encrypted data as well as new data generated and preferably new data replacing outliers from the plurality of data input streams processed by the data processing unit.

The invention further relates to a data processing program for preparing a dataset comprising instructions which, when executed by a data processing unit according to the invention, cause a data processing method according to the invention to be implemented.

The invention further relates to a recording medium on which the data processing program according to the invention is recorded.

Other advantages and features of the invention will appear upon reading the following description given by way of illustrative and non-limiting example, with reference to the appended figures.

DESCRIPTION OF THE INVENTION

Figure 1:
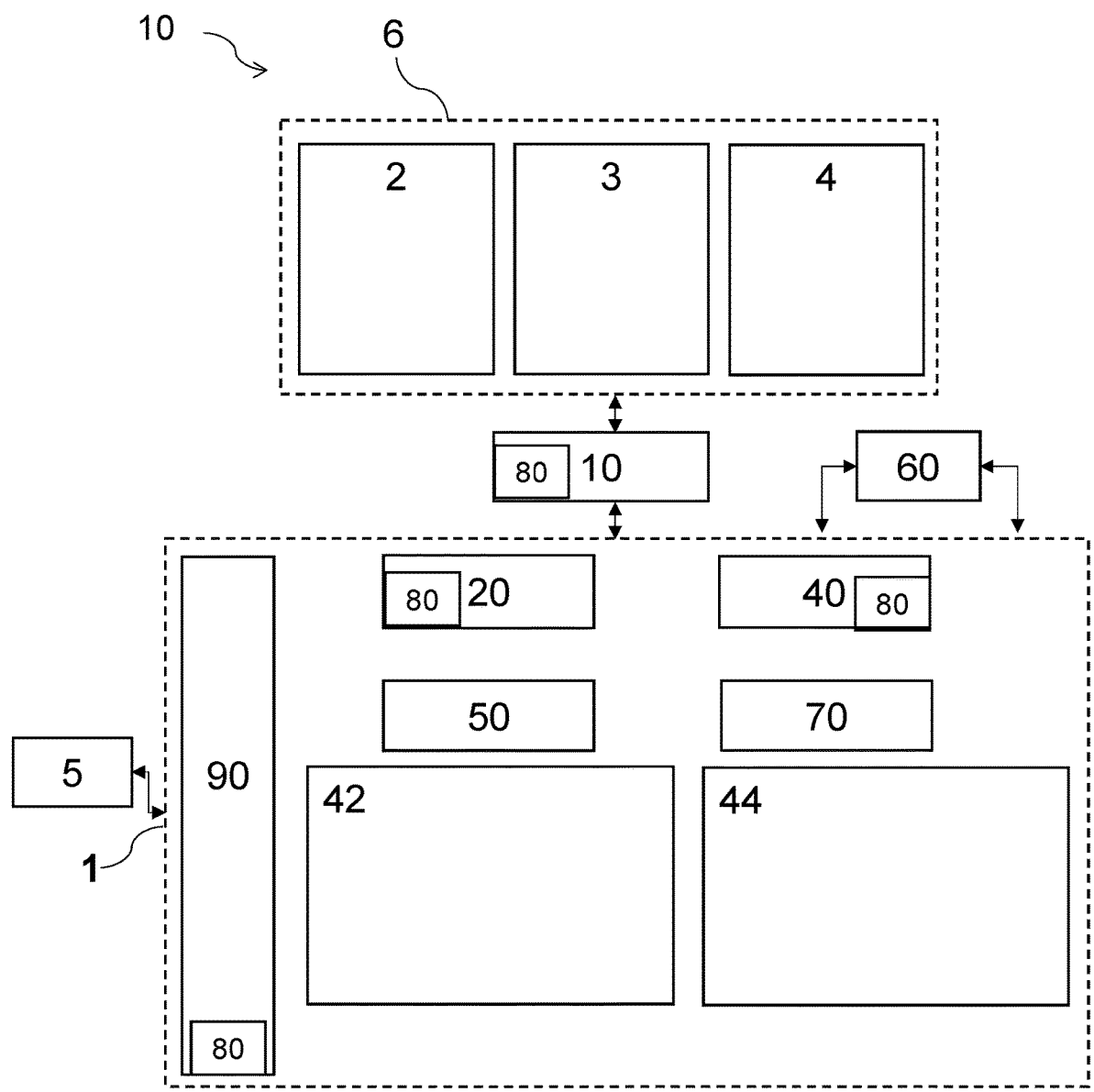
FIG. 1 shows a diagram of an embodiment of a system according to the invention.

The expression "transition to an anomaly", within the meaning of the invention, corresponds to a moment when a metric or a plurality of metrics (related or not) present a risk or a result obtained by computing, of exceeding a predetermined threshold or indicative of a risk of failure or technical incident on the IT infrastructure.

The expression "technical incident" or the term "failure", within the meaning of the invention, corresponds to a slowdown or shutdown of at least part of the IT infrastructure and its applications. A technical incident can be caused by a network error, a process failure or a failure of part of the system.

The expression "performance indicator" or "metric", within the meaning of the invention, corresponds to a technical or functional property of one or more elements of an IT infrastructure or its environment representing the operating conditions or state of said IT infrastructure. In addition, a performance indicator can correspond to a combination of properties or mathematical transformations of properties. For example, a performance indicator can be the derivative of a property of an IT infrastructure element or a ratio between the properties of two IT infrastructure elements.

By "computing device" is meant any computing device or computing infrastructure comprising one or more hardware and/or software resources configured to send and/or receive data streams and to process them. The computing device can be a computing server.

The expression "performance indicator value" or "metric value", within the meaning of the invention, corresponds to a measurement or calculation value of a technical or functional property of one or more elements of an IT infrastructure representing the operating state of said IT infrastructure.

The expression "industrial production sensors", within the meaning of the invention, corresponds to connected objects. Industrial production sensors correspond to machine sensors, dedicated to the measurement of data relating to machines, preferably production machines such as industrial machines. Thus, industrial production sensors will be able to generate data expressed as a speed (for example revolutions per minute), rate, weight or any other units useful in an industrial context. Industrial production sensors can also be environmental sensors capable of measuring temperature, pressure, humidity, for example. In particular, industrial production sensors correspond to computing probes.

By "Data Providers" is meant any sensors (such as industrial production sensors), probes (such as computing probes) or computer programs capable of generating industrial process monitoring data. They can also correspond to computing devices such as servers that manage data generated by sensors, probes or computer programs.

The expression "industrial process", within the meaning of the invention, corresponds to a process for the production of consumer goods, which includes, for example, electronic objects, mechanical objects, foodstuffs, or pharmaceuticals or phytopharmaceuticals. In addition, an industrial process can be controlled via an IT infrastructure. Thus, monitoring an industrial process corresponds to monitoring an IT infrastructure.

The term "learning", within the meaning of the invention, corresponds to a method designed to define a function f allowing a value Y to be calculated from a base of n labeled (X1 . . . n, Y1 . . . n) or unlabeled (X1 . . . n) observations. Learning can be said to be supervised when it is based on labeled observations and unsupervised when it is based on unlabeled observations. In the context of the present invention, learning is advantageously used for calibrating the method and thus adapting it to a particular computing infrastructure.

The term "model" or "machine learning model" or "rule" or "algorithm", within the meaning of the invention, for example, correspond to a finite sequence of operations or instructions for calculating a value by classifying or partitioning the data within predefined groups Y and for assigning a score or ranking one or more data within a classification. The implementation of this finite sequence of operations allows, for example, to assign a label Y to an observation described by a set of characteristics or parameters X, using for example the implementation of a function f likely to reproduce Y, having observed X. $Y=f(X)+e$ where e symbolizes noise or measurement error.

The expression "computing infrastructure", within the meaning of the invention, corresponds to a set of computing structures (that is to say computing devices) capable of running an application or an application chain. The IT infrastructure can be one or more servers, computers, or include industrial controllers. Thus, the IT infrastructure corresponds to a set of elements including a processor, a communication interface and memory.

By "probe" or "computing probe" is meant, within the meaning of the invention, a device, software or process associated with equipment which makes it possible to carry out, manage and/or feedback to computer equipment measurements of the values of performance indicators such as system parameters. This can be broadly defined as resource usage values, application runtime parameter values, or resource operating state values. A probe according to the invention therefore also encompasses software or processes capable of generating application logs or event histories ("log file" in Anglo-Saxon terminology). In addition, probes can also be physical sensors such as temperature, humidity, water leakage, power consumption, motion, air conditioning, and smoke sensors.

By "process", "calculate", "determine", "display", "extract", "compare" or more broadly an "executable operation" is meant, within the meaning of the invention, an action performed by a device or a processor unless the context indicates otherwise. In this regard, the operations relate to actions and/or processes of a data processing system, for example a computer system or an electronic computing device, which manipulates and transforms the data represented as physical (electronic) quantities in the memories of the computer system or other devices for storing, transmitting or displaying information. These operations are based on applications or software.

The terms or expressions "application", "software", "program code", and "executable code" mean any expression, code or notation, of a set of instructions intended to cause a data processing to perform a particular function directly or indirectly (for example after a conversion operation into another code). Exemplary program codes include, but are not limited to, a subprogram, a function, an executable application, a source code, an object code, a library and/or any other sequence of instructions designed for being performed on a computer system.

By "processor" is meant, within the meaning of the invention, at least one hardware circuit configured to perform operations according to instructions contained in a code. The hardware circuit includes an integrated circuit. Examples of a processor include, but are not limited to, a central processing unit, a graphics processor, an application-specific integrated circuit (ASIC), and a programmable logic circuit.

By "coupled" is meant, within the meaning of the invention, connected, directly or indirectly, with one or more intermediate elements. Two elements, for example, are coupled mechanically, electrically or linked by a communication channel.

The expression "human-machine interface", within the meaning of the invention, corresponds to any element allowing a human being to communicate with a computer, in particular and without that list being exhaustive, a keyboard and means allowing in response to the commands entered on the keyboard to perform displays and optionally to select with the mouse or a touchpad items displayed on the screen. Another embodiment is a touch screen for selecting directly on the screen the elements touched by the finger or an object and optionally with the possibility of displaying a virtual keyboard.

The term "resource", within the meaning of the invention, corresponds to parameters, capacities or functions of computing devices allowing the operation of a system or an application process. A same computing device is usually associated with several resources. Similarly, a same resource can be shared between several application processes. A resource is usually associated with a unique identifier that can be used to identify it within an IT infrastructure. For example, the term "resource" includes: network disks characterized by performance indicators such as, for example, by their inputs/outputs, reading/writing on disks, memories characterized by a performance indicator such as the usage rate, a network characterized by its bandwidth, a processor characterized for example by its usage (in percent) or the occupancy rate of its caches, a random access memory characterized by the quantity allocated. By "resource usage" is meant the consumption of a resource, for example by a business application.

By "predetermined threshold" is meant, within the meaning of the invention, a parameter maximum value associated with each resource allowing proper operation of said resource. For example, this corresponds to the maximum acceptable resource consumption limits for an IT infrastructure hosting one or more application bricks. These limits are real or hypothetical and generally correspond to a level of use beyond which malfunctions may occur and result in a shutdown of the resource, the IT infrastructure or at least reductions in quality of service. For example, Table 1 below shows the predetermined maximum usage thresholds for three resources.

By "execution rules" is meant, within the meaning of the invention, predetermined parameters for the execution of a scheduling plan, compliance with which allows execution that meets the needs of the IS administrator. These rules, in particular, include chaining orders to be respected, schedules to be respected, resource consumption thresholds to be respected, predetermined functions to be used.

The expression "connected object", within the meaning of the invention, corresponds to an electronic object connected, by a wired or wireless connection, to a data transport network, so that the connected object can share data with another connected object, a server, a fixed or mobile computer, an electronic tablet, a smartphone or any other connected device in a given network. In a manner known per se, such connected objects can be, for example, tablets, smart lighting devices, industrial tools or smartphones.

In the following description, the same references are used to designate the same elements.

As mentioned, machine learning is a major part of the fourth industrial revolution. Thus, industrial processes are more and more frequently improved through the integration of artificial intelligence or, more specifically, machine learning models capable of addressing technical problems as varied as there are industrial processes.

In particular, machine learning is based on a multitude of data that can come from several different sources and can therefore be highly heterogeneous. Thus, with the methods of the prior art, it is common for a team of data scientists to be trained in data processing and set up data processing processes. Nevertheless, when data sources are diverse and vary over time, the prior art methods are not reactive and can cause shutdowns of industrial processes. Indeed, when machine learning is used for industrial process control, a non-adapted preprocessing of this multitude of data sources can lead to a decrease in the responsiveness of control processes or worse a lack of sensitivity.

This can lead to risks for the industrial processes being controlled but also for the people working in contact with these industrial processes. To avoid these technical problems of shutdown of industrial processes, the inventors developed new automated processes for processing datasets from several data providers.

In particular, as will be detailed below, the inventors developed a data processing device, system and method for preparing a dataset to be used by a learning model. Advantageously, a data processing device, system or method according to the invention will allow a dataset to be prepared for training a machine learning model but also as input data allowing prediction by the machine learning model based on these preprocessed test data.

For this purpose, the inventors therefore proposed a data processing method for preparing a dataset for analyzing all the results provided by the different methods in order to help the user choose the interpretation that seems to correspond most to the dataset studied.

In particular, the inventors propose a method, system and device capable of preparing a dataset from a plurality of data input streams from several different providers. Indeed, within a complex system (for example an industrial process, a set of servers, applications or equipment within a data center), some anomalies can cause serious operating problems, for example through a cascade effect. However, it is necessary to be able to make the best use of the different data sources in order not to miss a weak signal from a data stream from a particular provider that has not been properly processed.

The invention therefore relates to a data processing system 10 for preparing a dataset. In particular, the dataset can be implemented within a machine learning model that can be used for monitoring an industrial process.

In particular, as illustrated in FIG. 1, the data processing system 10 for preparing a dataset comprises a computing device comprising a data processing unit 1, and a group of interconnected processing modules.

The data processing unit 1 is included in a computing device which can advantageously be adapted to interact or integrate with a computing infrastructure such as a high performance computing system or more generally with any system comprising one or more data input streams which can be analyzed to determine mathematical functions or algorithms for interpreting the data in the data stream.

In addition, the data processing unit 1 comprises a group of interconnected processing modules configured to analyze the one or more data streams and to prepare, from said one or more data streams, an output dataset 5 from the data processing unit 1. As it will appear in the description, the interconnected modules can be configured to implement various functions for in fine, that is to say at the output of the data processing unit 1, obtaining a dataset different from the input dataset and adapted for the training of a prediction model via supervised or unsupervised learning techniques. In addition, the processing method will be able to continuously transmit the preprocessed dataset to a machine learning model which will be responsible, from this preprocessed dataset, for monitoring an industrial process. Preferably, in the context of a method according to the invention, the transmission of the preprocessed dataset to the machine learning model is in real time. In particular, starting from the reception of the plurality of data streams, a method according to the invention preferably comprises generating a set of preprocessed data, and preferably transmitting to the machine learning model, within a period of less than or equal to ten minutes, more preferably less than or equal to five minutes, even more preferably less than or equal to one minute.

Furthermore, in the context of a method according to the invention, the data input streams are preferably processed continuously. Continuous monitoring corresponds, for example, to measurements or processing carried out at a frequency less than or equal to one hour, preferably less than or equal to 30 minutes, more preferably less than or equal to five minutes, for example less than or equal to ten seconds. It should be noted that not all data streams will necessarily be measured or processed at a same frequency.

In particular, the group of interconnected processing modules comprises a data descriptive analysis module 20 and a data processing module 40.

The data descriptive analysis module 20 allows the plurality of data input streams 2, 3, 4 to be normalized at the input of the processing unit 1. Normalization of data makes it possible to have standardized data, in particular through the implementation of algorithms allowing data to be centered and reduced so that it can be used a posteriori in supervised or unsupervised learning techniques. Thus, this allows for the processing and comparison of variables present in the data of the input streams 2, 3, 4.

The data descriptive analysis module 20 is further configured to transform the plurality of normalized data input streams into a plurality of normalized and encrypted data input streams. For this purpose, the data descriptive analysis module 20 is configured to implement encoding algorithms that allow, in particular, the processing of categorical variables. By way of illustrative examples, an encoding algorithm may correspond to a "one-hot" type encoding algorithm which consists in encoding a variable with n states over n bits, only one of which takes the value 1, the number of the bit being 1 being the number of the state taken by the variable, or a "label encoding" type encoding algorithm which makes it possible to represent the n states of the categorical variables in n numerical states from 1 to n.

As for the data processing module 40, it is configured to complete the dataset from the plurality of normalized and encrypted data input streams. Indeed, in order to generate a quality output dataset, that is to say allowing a robust prediction model to be built, the data processing module 40 is configured to proceed to a data augmentation for the completion of the missing data taking into account the consistency of the normalized and encrypted data.

Indeed, normalized and encrypted data can correspond to structured data or unstructured data (that is to say images). Depending on the type of normalized and encrypted data, different techniques can be implemented by the data processing module 40 in order to complete the missing data. For this purpose, the data processing module 40 is configured to take into account the consistency of the normalized and encrypted data with predefined correlation tables 42, and to determine from said correlation tables 42 a processing to be applied to the normalized and encrypted data in order to complete the missing data. By way of illustrative examples, the data processing module 40 can implement techniques for replacing missing data with the mean, the median, the most frequent state in particular in the case of a categorical variable, by interpolation or even via reconstruction techniques for unstructured data such as images or videos.

In order to obtain an output dataset 5 allowing a "normal" behavior of the data to be characterized as faithfully as possible. Indeed, the data processing module 40 is configured to detect outliers and remove them in order to provide an output dataset 5 representing "normal" behavior that can be used as a basis for the generation of a prediction model. For example, in the context of an application to high performance computing systems, normal behavior may be associated with the operation of the system in which none of the performance indicators has an anomaly.

To detect such outliers, the data processing module 40 is configured to process the normalized and encrypted data with functions 44. The functions 44 may include a plurality of different functions that allow the detection of outliers such as:

- the use of a distribution function, which allows the values of which are above a predetermined maximum threshold and below a predetermined minimum threshold to be taken as "outliers" data.
- the use of a "boxplot" or mustache box type algorithm, only the values on the interval: [Q1−1.5EI; Q3+1.5EI] where Q1, Q3 and EI are the first quartile, third quartile and interquartile, respectively.
- the use of a "Local outlier factor" type algorithm or local density calculation based on the k-nearest neighbors, allowing a score to be given to each of the points according to its accessibility from its neighbors.
- the use of a "DBSCAN" type partitioning algorithm, "DBSCAN" for Density Based Spatial Clustering of Applications with Noise according to Anglo-Saxon terminology.
- the use of an algorithm implementing Thompson's Tau test.

The data processing module 40 is further configured to verify the fit of the plurality of data input streams processed with the predetermined functions 44. Indeed, it is necessary to determine whether the data augmentation for completing the missing data and the use of functions make it possible to explain/interpret the behavior of normalized and encrypted data in order to be able to generate a robust prediction model from these data.

For this purpose, the data processing module 40 is configured to provide a representation of the normalized and encrypted data by functions characterized by symmetrical continuous, asymmetrical continuous and discrete probability laws. For each of these probability laws, the data processing module 40 is configured to calculate a fit index of the normalized and encrypted data by implementing fit tests such as the Anderson-Darling test, the Cramer Von Mises test, the Kolmogorov-Smirnov test or the Chi$^2$ test.

For each probability law used, a fit index between 0 (indicating no fit) and 1 (indicating a fit) is calculated for each fit test. Advantageously, such data can be displayed via a man-machine interface, such as a screen, thus making it possible to provide the user, for each variable present in the normalized and encrypted data, with a table containing the fit indices per variable as a function of the probability law considered and per fit test. For this purpose, the data processing unit 1 may advantageously comprise a communication module 70, configured to transmit information related to the processing of normalized and encrypted data to the user via a man-machine interface associated with a computing device.

In order to select the most relevant predetermined function 44 for the representation of a data stream of the plurality of data input streams from the normalized and encrypted data, the data processing module 40 can be configured to select the predetermined function 44 for which the fit between said predetermined function and a data stream has the smallest discrepancy. As described above, for each probability law used, a fit index between 0 (indicating no fit) and 1 (indicating a fit) is calculated for each fit test. In one particular embodiment, the data processing module 40 can be configured to select the predetermined function 44 having a fit average calculated from the sum of the fit indices of the normalized and encrypted data, for each function 44, closest to 1. This thus allows the function 44 that represents most faithfully the data input stream to be selected.

Alternatively, the data processing module 40 can be configured to select the predetermined function 44 having the highest number of fit indices above a predetermined fit threshold for the normalized and encrypted data.

The data processing module 40 can further be configured to classify the missing data generated during data augmentation and in particular to store them in a suitable data memory of the computing device comprising the data processing unit 1. Advantageously, the data processing module 40 can be configured to indicate whether the algorithm, or processing, used to complete the missing data has allowed verification of a fit between generated replacement data and a predetermined function 44.

Depending on the type of normalized and encrypted data, different techniques can be implemented by the data processing module 40 in order to complete the missing data. For this purpose, the data processing module 40 is configured to take into account the consistency of the normalized and encrypted data with predefined correlation tables 42, and to determine from said correlation tables 42 a processing to be applied to the normalized and encrypted data in order to complete the missing data. By way of illustrative examples, the data processing module 40 can implement techniques for replacing missing data with the mean, the median, the most frequent state in particular in the case of a categorical variable, by interpolation or even via reconstruction techniques for unstructured data such as images or videos.

Advantageously, such data can be displayed via a man-machine interface, such as a screen, thus making it possible to provide the user, for each variable present in the normalized and encrypted data, with a table containing the fit indices per variable as a function of the probability law considered and per fit test. For this purpose, the data processing unit 1 may advantageously comprise a communication module 70, configured to transmit information related to the processing of normalized and encrypted data to the user via a man-machine interface associated with a computing device.

In addition, the group of interconnected processing modules may comprise a data injection module 60 included or not in the data processing unit 1. The main function of such a module is to inject the normalized and encrypted data back for further processing by the data processing module 40.

In addition, the group of interconnected processing modules may comprise an input control module 10 configured to acquire each of the plurality of data input streams 2, 3, 4 from a data store 6, the format of which is immediately usable by the data processing unit 1.

In one particular embodiment, the computing device may further comprise a format data memory coupled to the data processing unit 1 for storing a set of defined formats and a set of rules determining how data is formatted from the data formats stored in the memory.

In particular, the present invention relates to a data processing system for preparing a dataset implemented by a computing resource such as a computer, comprising a data processing unit, said data processing unit receiving a first plurality of data input streams from different data providers, and comprising a group of interconnected processing modules through which the first plurality of data streams pass to prepare the output dataset, the plurality of data input streams and the output dataset being different, said system comprising:
A data descriptive analysis module, configured to
from the plurality of data input streams, standardize the data at the input of the processing unit, and
transform the plurality of normalized data input streams into a plurality of normalized and encrypted data input streams,
A data processing module, configured to, from the plurality of normalized and encrypted data input streams, process missing data, allowing missing data to be replaced,
A data output means configured to output the dataset from the plurality of processed data input streams from the data processing unit.

The invention further relates to a data processing unit for preparing a dataset implemented by a computing resource such as a computer, comprising a first plurality of data input streams from different data providers, and comprising a group of interconnected processing modules through which the first plurality of data streams pass to prepare the output dataset, the plurality of data input streams and the output dataset being different, said processing unit comprising:
A data descriptive analysis module, configured to
from the plurality of data input streams, standardize the data at the input of the processing unit, and
transform the plurality of normalized data input streams into a plurality of normalized and encrypted data input streams,
A data processing module, configured to, from the plurality of normalized and encrypted data input streams, process missing data, allowing missing data to be replaced,
A data output means configured to output the dataset from the plurality of processed data input streams from the data processing unit.

The invention further relates to a data processing method 100 for preparing a dataset.

Figure 2:
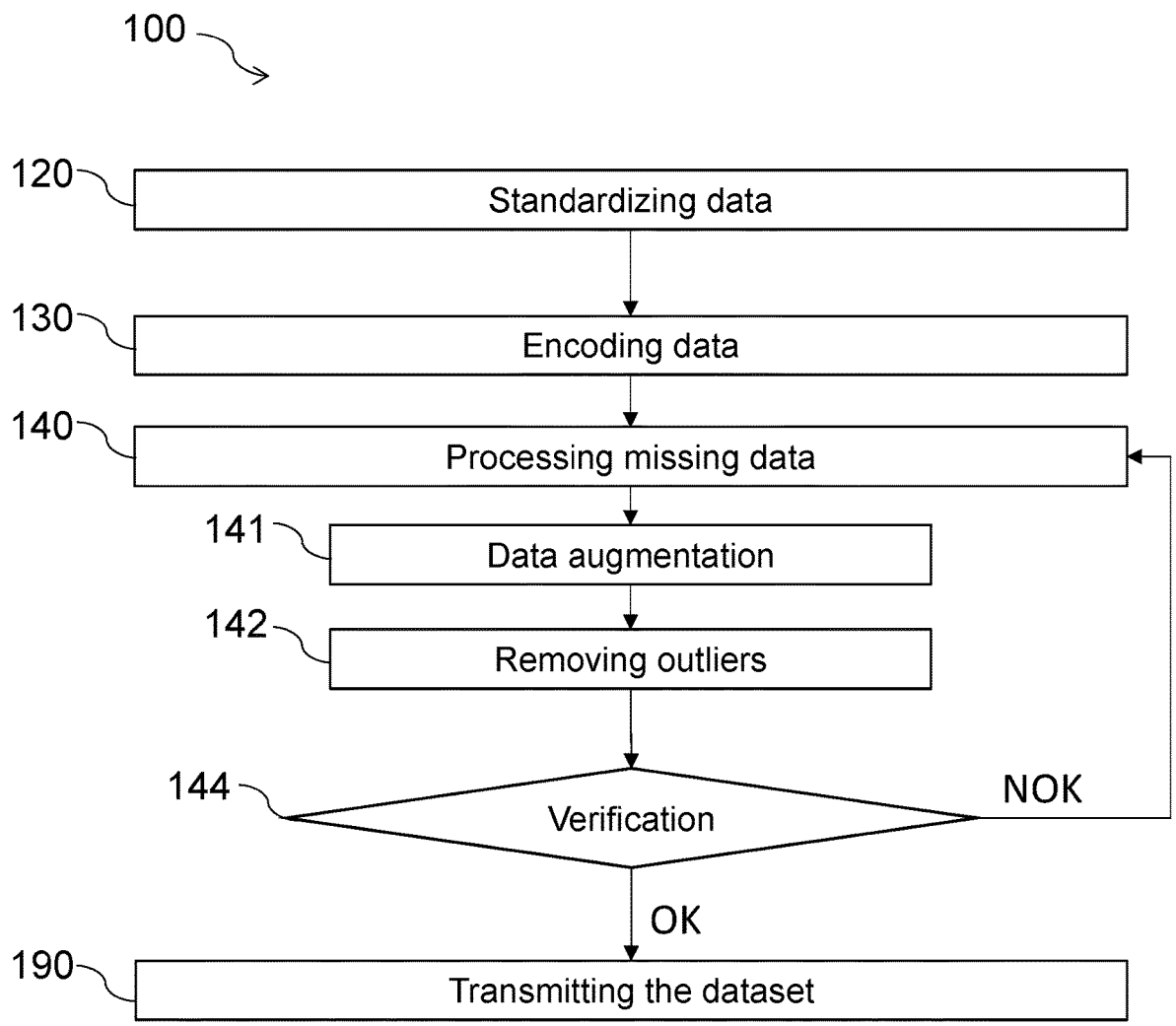
FIG. 2 shows a diagram of an embodiment of the method according to the invention.
Figure 3:
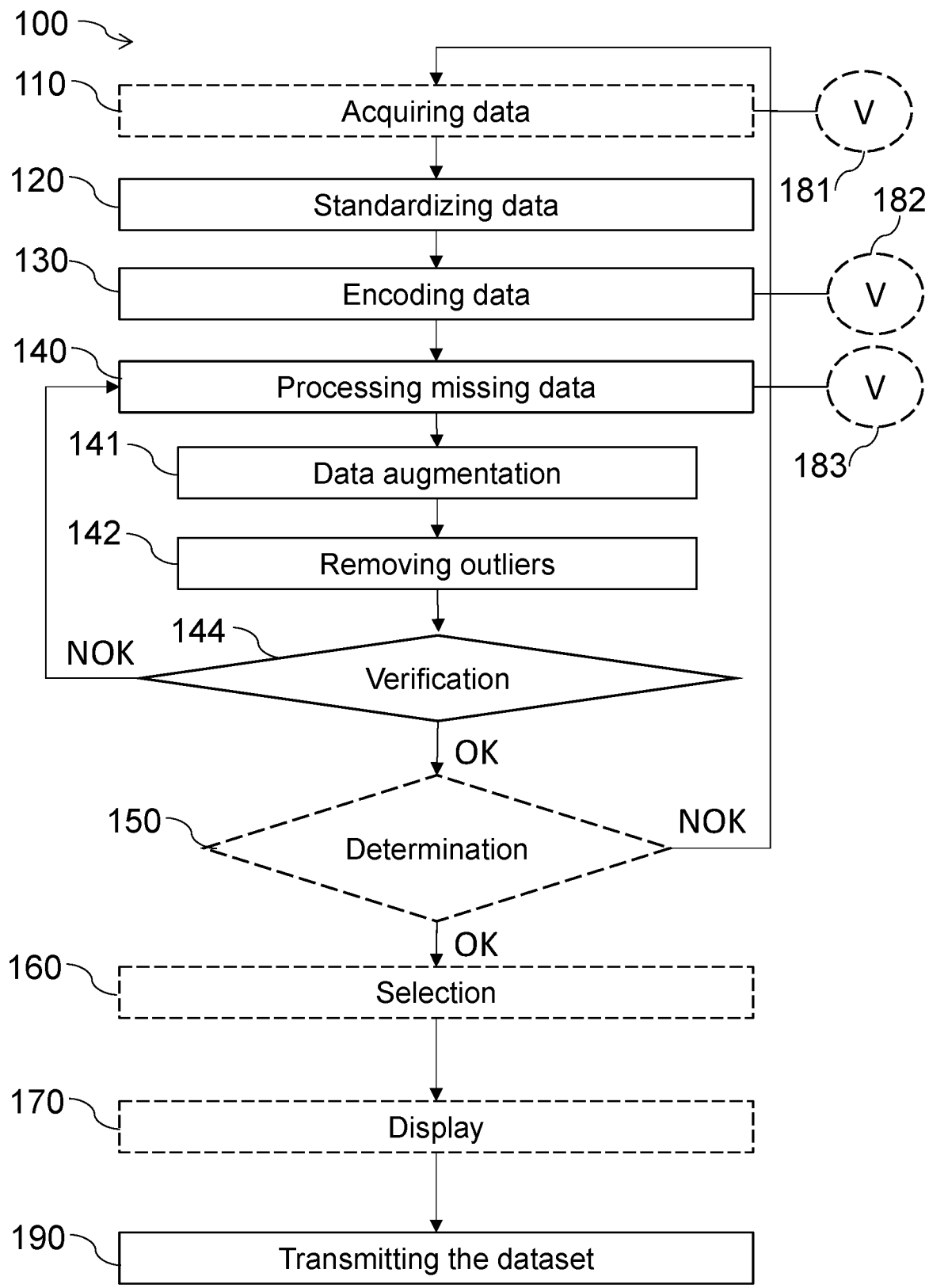
FIG. 3 shows a diagram of an embodiment of a step of the method according to the invention.
Figure 4:
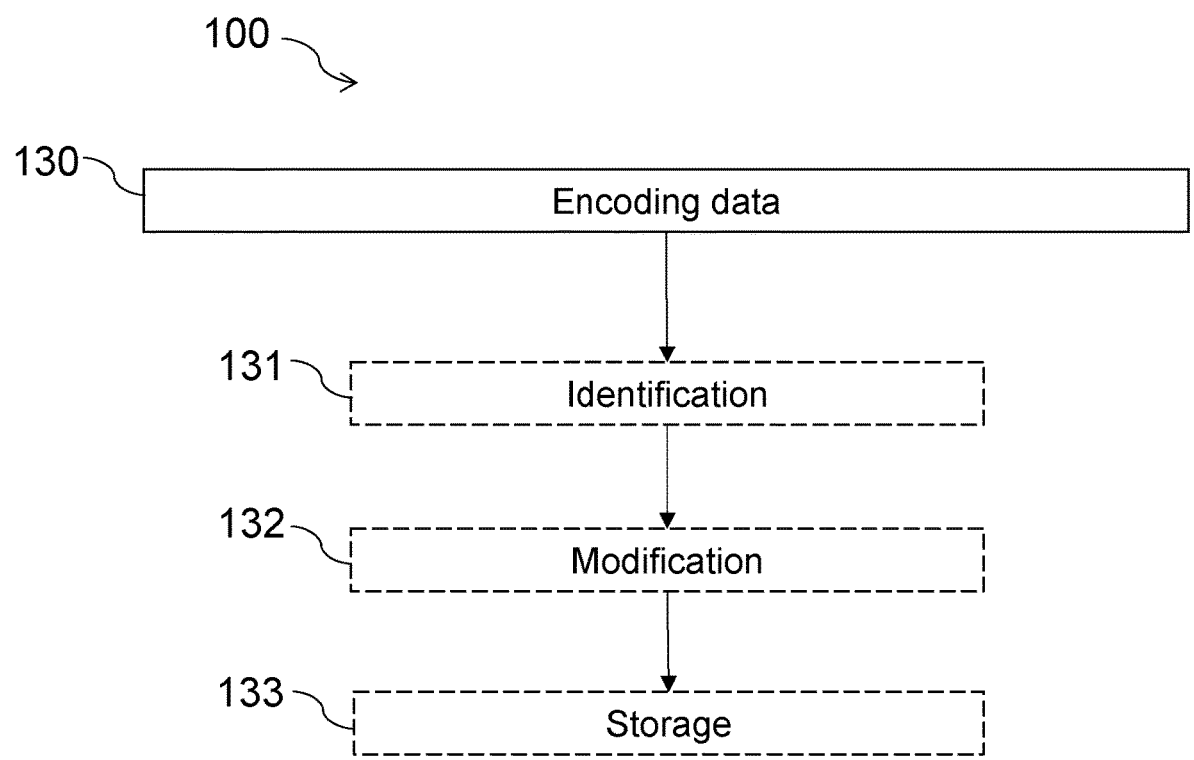
FIG. 4 shows a diagram of an embodiment of the method according to the invention.
Figure 5:
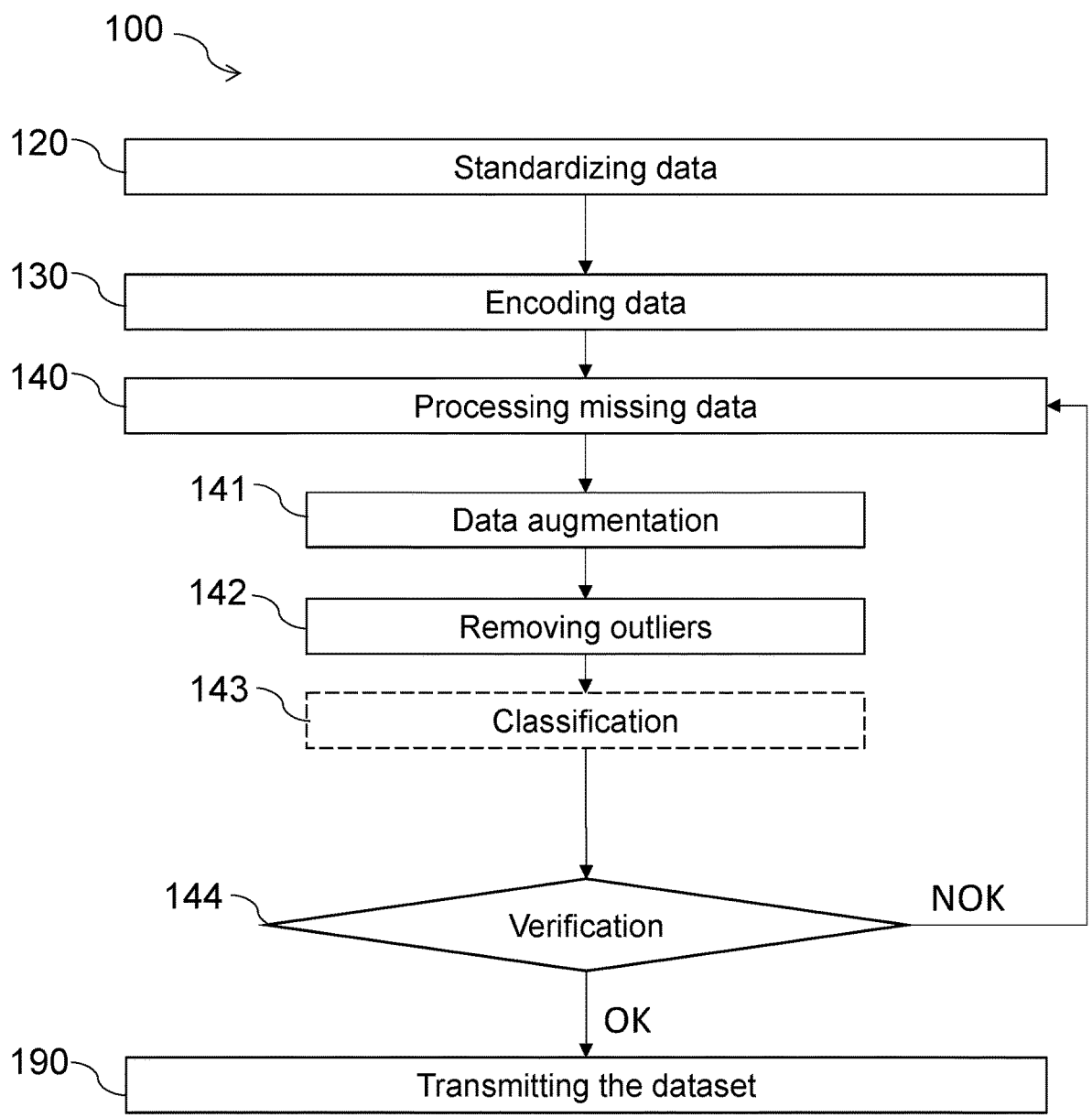
FIG. 5 shows a diagram of an embodiment of the method according to the invention.

In particular, as shown in FIG. 2, the data processing method 100 is implemented by a computing device comprising a data processing unit 1 as described in connection with FIGS. 2 to 4.

When the data processing unit receives a plurality of data input streams 2, 3, 4 from different data providers, the data processing method 100 can implement a step of standardizing 120 the plurality of data input streams 2, 3, 4, by a data descriptive analysis module 20, from the plurality of data input streams, for standardizing the data at the input of the processing unit 1. This standardization step may concern only part of the data streams. Indeed, it is possible that some data do not require standardization.

By way of non-limiting examples, the plurality of data streams 2, 3, 4 can correspond to performance indicators of a high performance computing infrastructure such as: resource usage, event history, software errors, hardware errors, response times, application traffic, service load, network traffic, file modifications, number of users of a service, number of sessions, number of processes, temperature values, humidity values, and power consumption. In particular, performance indicators may include: network throughput, network latency, CPU usage, memory usage, server response time, number of slow pages and/or number of transactions.

A method according to the invention comprises a step of encoding 130 the normalized data, by the data descriptive analysis module 20, for transforming the plurality of normalized data input streams into a plurality of normalized and encrypted data input streams.

Indeed, the plurality of data input streams 2, 3, 4 generally come from different data sources. In particular, the plurality of data input streams 2, 3, 4 may include performance indicator values that can be generated by computing probes dedicated to monitoring performance indicators of an IT infrastructure. Thus, the method can be carried out at least in part from performance indicator values generated by probes dedicated to monitoring IT infrastructure performance indicators.

The method further comprises a step of preprocessing 140 the dataset, preferably missing data, by a data processing module 40, from the plurality of normalized and encrypted data input streams.

In particular, the processing step may include a step of data augmentation 141 for the completion of the missing data taking into account the consistency of the normalized and encrypted data with predefined correlation tables 42.

The determination step may also include a step of detecting outliers of the plurality of normalized and encrypted data input streams, by processing said normalized and encrypted data by predetermined functions 44. In particular, the method may include a step of removing 142 outliers and preferably a step of replacing outliers with replacement data.

In particular, the processing step may include a step of verifying 144 the fit of the plurality of data input streams processed with the predetermined functions 44, said verification step comprising the data processing module 40 providing feedback to take actions aiming at injecting the plurality of processed data input streams back into the data processing module 40 when the fit of the plurality of data input streams processed with the predetermined functions 44 is divergent.

In addition, a method according to the invention may include a step of transmitting a preprocessed dataset, said dataset including normalized and encrypted data as well as new data generated during the step of data augmentation and preferably new data replacing outliers. Such a transmission may be made by a processor to a memory for storage or by a communication module to another device on the same or another network. For example, a method according to the invention may include a step of transmitting 190 from the plurality of processed data input streams of the data processing unit, the dataset by a data output means 90.

Indeed, very often within the context of industrial processes, managed or not via IT infrastructure, the plurality of data input streams 2, 3, 4 can include data of very different nature, these data can in particular be structured or unstructured data. This is particularly the case when the industrial process involves high performance computing infrastructure. In addition, in many cases the data may be insufficient for use in a prediction model and will need to be subject to a data augmentation step to allow for output.

Advantageously, the data encoding step 130 can comprise:
identifying 131 the data to be encoded,
modifying 132 the identified data into encoded data, and/or
storing 133 the encoded data.

In addition, the dataset preprocessing step 140 may further comprise a step 143 of classifying the missing data, by the data processing module 40.

The method may include a step 150 of determining the data quality of the dataset, comprising determining a reliability indicator and a validity indicator, by a systematic means of transformation 50. Indeed, when augmenting data or standardizing data, the algorithms used to perform such steps may not be appropriate. Such a data quality determination step 150 thus makes it possible to estimate whether the data encoding, standardization or augmentation preliminary steps have made it possible to generate a dataset potentially usable for the development of a prediction model.

Advantageously, when the reliability indicator and the validity indicator are respectively lower than a predetermined value, the data of the dataset can be injected back into the data processing unit 1, by a data injection module 60. This allows the steps of data standardization, data encoding 130 and dataset preprocessing 140 to be repeated until a dataset that can potentially be used to build a prediction model is obtained.

A method according to the invention may comprise a prior step of acquiring 110 each data input stream of the plurality of data input streams 2, 3, 4, by an input control module 10, from a data store 6, the format of which is immediately usable by the data processing unit 1. This limits the degradation of the dataset during the data standardization, encoding or augmentation steps.

The method according to the invention further comprises a step of displaying 170, by a communication module 70, the steps of data processing, the data correlations, the selected predetermined functions, the consistency of the data with predefined correlation tables, the fit of the plurality of data input streams processed with predetermined functions. Indeed, it may be advantageous for the user to be able to access this information, in particular via a man-machine interface of an associated computing device.

A method according to the invention may further comprise verification 181, 182, 183 according to a set of determined rules, at the output of interconnected processing modules through which the plurality of data streams pass to prepare the dataset, comprising filter 80, each provided at the output of interconnected processing modules.

The method according to the invention may also comprise a step of selecting 160 a predetermined function for which the fit between said predetermined function and one of the plurality of data input streams has the smallest discrepancy, by the data preprocessing module 40.

The invention may relate in particular to a data processing method for preparing a dataset implemented by a computing resource such as a computer, comprising a data processing unit, said data processing unit receiving a first plurality of data input streams from different data providers, and comprising a group of interconnected processing modules through which the first plurality of data streams pass to prepare the output dataset, the plurality of data input streams and the output dataset being different.

The method may include a step of standardizing the plurality of data input streams, by a data descriptive analysis module, from the plurality of data input streams, for normalizing the data at the input of the processing unit.

The method may include a step of encoding the normalized data, by the data descriptive analysis module, for transforming the plurality of normalized data input streams into a plurality of normalized and encrypted data input streams.

The method may include a step of processing the missing data, by a data processing module, from the plurality of normalized and encrypted data input streams for replacing the missing data comprising:

A step of detecting outliers in the plurality of normalized and encrypted data input streams by comparing with predetermined functions according to predetermined minimum and maximum thresholds, An interpolation step for the completion of the missing data taking into account the consistency of the data with predefined correlation tables, A step of verifying the fit of the plurality of data input streams processed with predetermined functions comprising feedback to the data processing module to take actions aiming at injecting the plurality of processed data input streams back into the data processing module when the fit of the plurality of data input streams processed with the predetermined functions is divergent.

The method may include a step of outputting, from the plurality of processed data input streams from the data processing unit, the dataset by a data output means.

The invention also relates to an evaluation of an initial dataset and optionally to the preparation of an improved dataset from the initial dataset. Such a method can be implemented by a computing resource such as a computer, comprising a data processing unit, said data processing unit comprising a data descriptive analysis module, an analysis module and receiving an initial dataset from a data provider, said initial dataset including a several data subsets.

The method according to the invention may include a step of standardizing the dataset, by a data descriptive analysis module, said step including or being able to correspond to the standardization of each of the data subsets of the initial dataset.

The method according to the invention may also include an optional step of encoding the standardized data, by the data descriptive analysis module 20, said step including transforming the unencrypted data subsets into encrypted data subsets.

The method according to the invention may also include a data analysis step, by an analysis module, comprising:

A step of detecting outliers, said step including comparing each of the normalized data subsets to predetermined distribution functions, A fit verification step, said step including calculating several correlation indices for each of the data subsets with predetermined distribution functions.

The method according to the invention may also include a step of generating an evaluation of the data, by an evaluation module, said step including comparing the correlation indices for each of the data subsets and identifying, for each of the data subsets, the predetermined distribution functions allowing a correlation higher than a predetermined threshold.

What is claimed is:

1. A data processing method for preparing a dataset implemented by a processor that receives a plurality of data input streams from different data providers, wherein the plurality of data input streams pass through said processor to prepare an output dataset, wherein the plurality of data input streams and the output dataset are different, said data processing method comprising:
providing said processor, wherein via said processor,
receiving the plurality of data input streams from said different data providers that comprise industrial production sensors;
standardizing the plurality of data input streams to normalize the plurality of data input streams at an input of the processor;
encoding the plurality of data input streams that are normalized, to transform the plurality of data input streams that are normalized into a plurality of normalized and encrypted data input streams;
preprocessing the dataset from the plurality of normalized and encrypted data input streams, said preprocessing comprising
  data augmentation to complete missing data taking into account a consistency of the plurality of normalized and encrypted data input streams with predefined correlation tables,
  providing functions that comprise a plurality of different functions that allow a detection of outliers in the plurality of normalized and encrypted data input streams,
  removing said outliers from the plurality of normalized and encrypted data input streams, by processing said plurality of normalized and encrypted data input streams with said functions,
  verifying a fit of the plurality of normalized and encrypted data input streams processed with the functions, said verifying comprising providing feedback to take actions aiming at injecting the plurality of normalized and encrypted data input streams that are processed back into the processor when the fit of the plurality of normalized and encrypted data input streams that are processed with the functions is divergent, and
  selecting a function of said functions for which the fit between said function and one of the plurality of data input streams comprises a smallest discrepancy;
generating a preprocessed dataset, said preprocessed dataset including
  said plurality of normalized and encrypted data input streams,
  new data generated during said data augmentation, and new data replacing said outliers;
displaying to a user, on a display associated with said processor,
  said functions,
  said consistency of the plurality of normalized and encrypted data input streams with predefined correlation tables,
  the fit of the plurality of normalized and encrypted data input streams processed with the functions, and
  a table containing fit indices for each variable present in the plurality of normalized and encrypted data input streams; and,
transmitting said preprocessed dataset to a machine learning model that is trained to monitor an industrial process via supervised or unsupervised learning techniques,
  such that said machine learning model is trained to one or more of predict maintenance, detect failure, detect fraud and detect cyber-attacks.

2. The data processing method according to claim 1, wherein the industrial production sensors include connected objects, or machine sensors, or environmental sensors, or computing probes, or any combination thereof.

3. The data processing method according to claim 1, wherein the industrial process is an agri-food production process, or a manufacturing production process, or a chemical synthesis process, or a packaging process, or a process for monitoring an IT infrastructure.

4. The data processing method according to claim 1, further comprising automatically modifying one or more of said functions for said removing said outliers and said predefined correlation tables for said data augmentation.

5. The data processing method according to claim 4, wherein the preprocessed dataset is used as input data to a learning model trained for monitoring said industrial process and wherein the automatically modifying is initiated when a variance is identified in the plurality of data input streams.

6. The data processing method according to claim 1, further comprising, via said processor, determining a reliability indicator and a validity indicator, wherein when said reliability indicator and said validity indicator are respectively lower than a predetermined value, the plurality of data input streams of the dataset is injected back into the processor, via said processor.

7. The data processing method according to claim 1, further comprising generating an evaluation of the plurality of data input streams to verify said fit, by said processor, wherein said generating said evaluation comprises comparing correlation indices for each data subsets of the plurality of data input streams and identifying, for each of the data subsets, predetermined distribution functions allowing a correlation higher than a predetermined threshold.

8. The data processing method according to claim 1, wherein the encoding the plurality of data input streams that are normalized comprises
  identifying data to be encoded,
  modifying the data that is identified into encoded data, and
  storing the encoded data.

9. The data processing method according to claim 1, wherein, via said processor, the data augmentation to complete the missing data further comprises classifying the missing data by assigning a score or a ranking.

10. A data processing system for preparing a dataset implemented by a processor that receives a plurality of data input streams from different data providers, wherein the plurality of data input streams pass through said processor to prepare an output dataset, wherein the plurality of data input streams and the output dataset are different,
  said data processing system comprising:
  a processor configured to
    receive the plurality of data input streams from said different data providers that comprise industrial production sensors;
    standardize the plurality of data input streams to normalize the plurality of data input streams at an input of the processor;
    encode the plurality of data input streams that are normalized, to transform the plurality of data input streams that are normalized into a plurality of normalized and encrypted data input streams;
    preprocess the dataset from the plurality of normalized and encrypted data input streams, said preprocess comprising
      completing missing data via data augmentation taking into account a consistency of the plurality of normalized and encrypted data input streams with predefined correlation tables,
      providing functions that comprise a plurality of different functions that allow a detection of outliers in the plurality of normalized and encrypted data input streams,
      removing said outliers from the plurality of normalized and encrypted data input streams, by processing said plurality of normalized and encrypted data input streams with said functions,
      verifying a fit of the plurality of normalized and encrypted data input streams processed with the functions, said verifying comprising providing feedback to take actions aiming at injecting the plurality of normalized and encrypted data input streams that are processed back into the processor when the fit of the plurality of normalized and encrypted data input streams processed with the functions is divergent, and selecting a function of said functions for which the fit between said function and one of the plurality of data input streams comprises a smallest discrepancy;

generate a preprocessed dataset, said preprocessed dataset including said plurality of normalized and encrypted data input streams, new data generated during said data augmentation, and new data replacing said outliers;

display to a user, on a display associated with said processor, said functions, said consistency of the plurality of normalized and encrypted data input streams with predefined correlation tables, the fit of the plurality of normalized and encrypted data input streams processed with the functions, and a table containing fit indices for each variable present in the plurality of normalized and encrypted data input streams; and, transmit said preprocessed dataset to a machine learning model that is trained to monitor an industrial process via supervised or unsupervised learning techniques, such that said machine learning model is trained to one or more of predict maintenance, detect failure, detect fraud and detect cyber-attacks.

\* \* \* \* \*